US009003492B2

(12) United States Patent
Katar et al.

(10) Patent No.: US 9,003,492 B2
(45) Date of Patent: *Apr. 7, 2015

(54) SECURE CLIENT AUTHENTICATION AND SERVICE AUTHORIZATION IN A SHARED COMMUNICATION NETWORK

(75) Inventors: Srinivas Katar, Gainsville, FL (US); Lawrence W. Yonge, III, Summerfield, FL (US); Richard E. Newman, Gainsville, FL (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/527,486

(22) Filed: Jun. 19, 2012

(65) Prior Publication Data
US 2013/0160086 A1 Jun. 20, 2013

Related U.S. Application Data

(60) Provisional application No. 61/499,562, filed on Jun. 21, 2011.

(51) Int. Cl.
*G06F 7/00* (2006.01)
*H04L 29/06* (2006.01)
(Continued)

(52) U.S. Cl.
CPC ............ *H04L 63/0892* (2013.01); *H04L 63/08* (2013.01); *H04L 67/16* (2013.01);
(Continued)

(58) Field of Classification Search
USPC ........... 726/4, 3, 116; 713/171, 310; 707/803; 709/203
See application file for complete search history.

(56) References Cited

U.S. PATENT DOCUMENTS 4,862,122 A   8/1989 Blair et al.
5,341,083 A   8/1994 Klontz et al.
(Continued)

FOREIGN PATENT DOCUMENTS

CN   103765857   4/2014
CN   103843304   6/2014
(Continued)

OTHER PUBLICATIONS

International Search Report and Written Opinion—PCT/US2012/043415—ISA/EPO—Oct. 10, 2012.
(Continued)

*Primary Examiner* — Beemnet Dada
*Assistant Examiner* — Sayed Beheshti Shirazi
(74) *Attorney, Agent, or Firm* — DeLizio Gilliam, PLLC

(57) ABSTRACT

Functionality for secure client authentication and service authorization in a shared communication network are disclosed. A managing network device of a communication network causes a securely connected client network device to perform an account authorization process with an accounting network device in parallel with a service matching process with the managing network device and one or more service providers of the communication network. The managing network device executes the service matching process and securely matches the client network device with one of the service providers. The accounting network device executes the account authorizing process with the client network device and provides a service voucher to the managing network device authorizing one or more of the service providers to service the client network device. The managing network device transmits the service voucher to the matched service provider to prompt the matched service provider to service the client network device.

31 Claims, 6 Drawing Sheets

(51) Int. Cl.
*H04L 29/08* (2006.01)
*H02J 7/00* (2006.01)

(52) U.S. Cl.
CPC ......... *H04L67/1021* (2013.01); *H04L 67/1023* (2013.01); *H02J 2007/0001* (2013.01); *H04B 2203/5458* (2013.01)

(56) References Cited

U.S. PATENT DOCUMENTS

| | | | |
|---|---|---|---|
| 6,182,139 B1 | 1/2001 | Brendel | |
| 6,252,674 B1 | 6/2001 | Takaoka | |
| 6,396,241 B1 | 5/2002 | Ramos et al. | |
| 6,978,142 B2 | 12/2005 | Jokimies | |
| 8,161,547 B1 | 4/2012 | Jennings et al. | |
| 8,429,396 B1 | 4/2013 | Trivedi et al. | |
| 2003/0125058 A1 | 7/2003 | Matsutani et al. | |
| 2004/0252668 A1* | 12/2004 | Ozukturk et al. | 370/335 |
| 2005/0215263 A1* | 9/2005 | Tsien et al. | 455/452.2 |
| 2005/0273803 A1* | 12/2005 | Takagi et al. | 725/23 |
| 2006/0014547 A1 | 1/2006 | Walter | |
| 2006/0136457 A1* | 6/2006 | Park et al. | 707/101 |
| 2006/0195464 A1 | 8/2006 | Guo | |
| 2007/0091864 A1* | 4/2007 | Honjo et al. | 370/338 |
| 2007/0230506 A1* | 10/2007 | Zou | 370/473 |
| 2008/0025382 A1 | 1/2008 | Okado | |
| 2008/0040296 A1 | 2/2008 | Bridges et al. | |
| 2008/0155093 A1 | 6/2008 | Dharmistan | |
| 2008/0228613 A1 | 9/2008 | Alexander | |
| 2008/0270528 A1* | 10/2008 | Girardeau et al. | 709/203 |
| 2008/0301446 A1 | 12/2008 | Yonge, III et al. | |
| 2009/0091291 A1 | 4/2009 | Woody et al. | |
| 2009/0091864 A1 | 4/2009 | Carey et al. | |
| 2009/0261779 A1 | 10/2009 | Zyren | |
| 2009/0288129 A1* | 11/2009 | Wolfe et al. | 725/116 |
| 2010/0049610 A1 | 2/2010 | Ambrosio et al. | |
| 2010/0161481 A1 | 6/2010 | Littrell | |
| 2010/0161482 A1* | 6/2010 | Littrell | 705/40 |
| 2010/0161518 A1 | 6/2010 | Littrell | |
| 2010/0211643 A1 | 8/2010 | Lowenthal et al. | |
| 2010/0269153 A1* | 10/2010 | Kato et al. | 726/3 |
| 2010/0274570 A1* | 10/2010 | Proefke et al. | 705/1.1 |
| 2010/0274697 A1 | 10/2010 | Zyren | |
| 2010/0315197 A1* | 12/2010 | Solomon et al. | 340/5.2 |
| 2011/0010043 A1 | 1/2011 | Lafky | |
| 2011/0022641 A1* | 1/2011 | Werth et al. | 707/803 |
| 2011/0025267 A1 | 2/2011 | Kamen et al. | |
| 2011/0099376 A1* | 4/2011 | Gupta et al. | 713/171 |
| 2011/0144844 A1* | 6/2011 | Ishibashi | 701/22 |
| 2011/0184587 A1* | 7/2011 | Vamos et al. | 700/297 |
| 2011/0191265 A1* | 8/2011 | Lowenthal et al. | 705/412 |
| 2011/0195738 A1 | 8/2011 | Hapsari et al. | |
| 2011/0213983 A1 | 9/2011 | Staugaitis et al. | |
| 2011/0241824 A1 | 10/2011 | Uesugi | |
| 2011/0254505 A1 | 10/2011 | Evander et al. | |
| 2011/0264530 A1* | 10/2011 | Santangelo et al. | 705/14.64 |
| 2011/0279082 A1* | 11/2011 | Hagenmaier et al. | 320/109 |
| 2012/0089286 A1* | 4/2012 | Nakata | 701/22 |
| 2012/0131360 A1* | 5/2012 | Zyren et al. | 713/310 |
| 2012/0281582 A1 | 11/2012 | Yang et al. | |
| 2013/0038424 A1 | 2/2013 | Katar et al. | |

FOREIGN PATENT DOCUMENTS

| | | |
|---|---|---|
| EP | 0862346 A2 | 9/1998 |
| EP | 1180886 A1 | 2/2002 |
| EP | 1324546 | 7/2003 |
| GB | 2472537 | 2/2011 |
| JP | 2003012099 | 1/2003 |
| JP | 2007069923 | 3/2007 |
| JP | 2008077267 | 4/2008 |
| JP | 2009094768 | 4/2009 |
| JP | 2010017006 | 1/2010 |
| JP | 2011034500 | 2/2011 |
| KR | 1020140047159 | 4/2014 |
| WO | 9530263 | 9/1995 |
| WO | 9530263 | 11/1995 |
| WO | 2004109439 | 12/2004 |
| WO | 20041109439 | 12/2004 |
| WO | 2010009502 A1 | 1/2010 |
| WO | 2010043659 | 4/2010 |
| WO | 2011044543 A2 | 4/2011 |
| WO | 2011154218 A2 | 12/2011 |
| WO | 2012071263 | 5/2012 |
| WO | 2013023164 | 2/2013 |

OTHER PUBLICATIONS

"PCT Application No. PCT/US2012/050402 International Search Report", Mar. 1, 2013, 12 pages.
Co-pending U.S. Appl. No. 61/522184, filed Aug. 10, 2011, 49 pages.
Co-pending U.S. Appl. No. 13/564,358, filed Jun. 21, 2011, 24 pages.
Co-pending U.S. Appl. No. 61/499,562, filed Aug. 1, 2012, 69 pages.
"U.S. Appl. No. 12/980,758 Final Office Action", Nov. 15, 2013, 23 pages.
"HomePlug Green PHY Specification", Release Version 1.00, HomePlug Powerline Alliance obtained from internet: http://www.homeplug.org/tech/homeplug_gp Jun. 14, 2010, 1 page.
"PCT Application No. PCT/US11/61360 International Search Report", Mar. 15, 2012, 13 pages.
"PCT Application No. PCT/US2011/061360 International Preliminary Report on Patentability", Mar. 6, 2013, 8 pages.
"U.S. Appl. No. 12/980,758 Final Office Action", Aug. 8, 2013, 17 pages.
"U.S. Appl. No. 12/980,758 Office Action", Feb. 28, 2013, 19 pages.
PCT Application No. PCT/US2012/050402 International Preliminary Report on Patentability, Nov. 26, 2013, 8 pages.
PCT Application No. PCT/US2012/043415 International Preliminary Report on Patentability, Sep. 2, 2013, 6 pages.
U.S. Appl. No. 12/980,758 Final Office Action, Mar. 6, 2014, 9 pages.
Machine Translation of "Korean Patent Application No. 1020147001689, KIPO Notice of Grounds for Rejection", Oct. 28, 2014, 23 pages.
"U.S. Appl. No. 13/564,358 Office Action", May 8, 2014, 24 pages.
"U.S. Appl. No. 12/980,758 Non Final Office Action", Jul. 3, 2014, 26 Pages.
"Taiwan Patent Application No. 101129015 Office Action", May 26, 2014, 11 pages.
"Taiwan Search Report—TW101129015—TIPO—May 22, 2014.", May 22, 2014, 1 page.
"Japanese Patent Application No. 2014517134, Office Action", Dec. 17, 2014, 7 pages.

* cited by examiner

SECURE CLIENT AUTHENTICATION AND SERVICE AUTHORIZATION IN A SHARED COMMUNICATION NETWORK

RELATED APPLICATIONS

This application claims the priority benefit of U.S. Provisional Application No. 61/499,562 filed Jun. 21, 2011.

BACKGROUND

Embodiments of the inventive subject matter generally relate to the field of communication networks and, more particularly, to secure client authentication and service authorization in a shared communication network.

Electric vehicles typically charge from conventional power outlets or dedicated charging stations. Prior to receiving power from the charging stations, the charging station can ensure that the user of the electric vehicle has a valid account and proper authorization to receive the electric power and to pay for the received electric power.

SUMMARY

Various embodiments of a secure client authentication and service authorization mechanism in a shared communication network are disclosed. In some embodiments, a secure communication channel is established between a client network device and a managing network device of a communication network based, at least in part, on a client identifier of the client network device. The managing network device causes the client network device to perform an account authorization process with an accounting network device in parallel with a service matching process with the managing network device and one or more of a plurality of service providers of the communication network. The client network device is securely matched with a first of the plurality of service providers. A service voucher is securely received at the managing network device from the accounting network device authorizing one or more of the service providers of the communication network to service the client network device in response to the accounting network device executing the account authorizing process with the client network device. The service voucher is securely transmitted from the managing network device to the matching service provider to allow the client network device to be serviced by the matching service provider.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
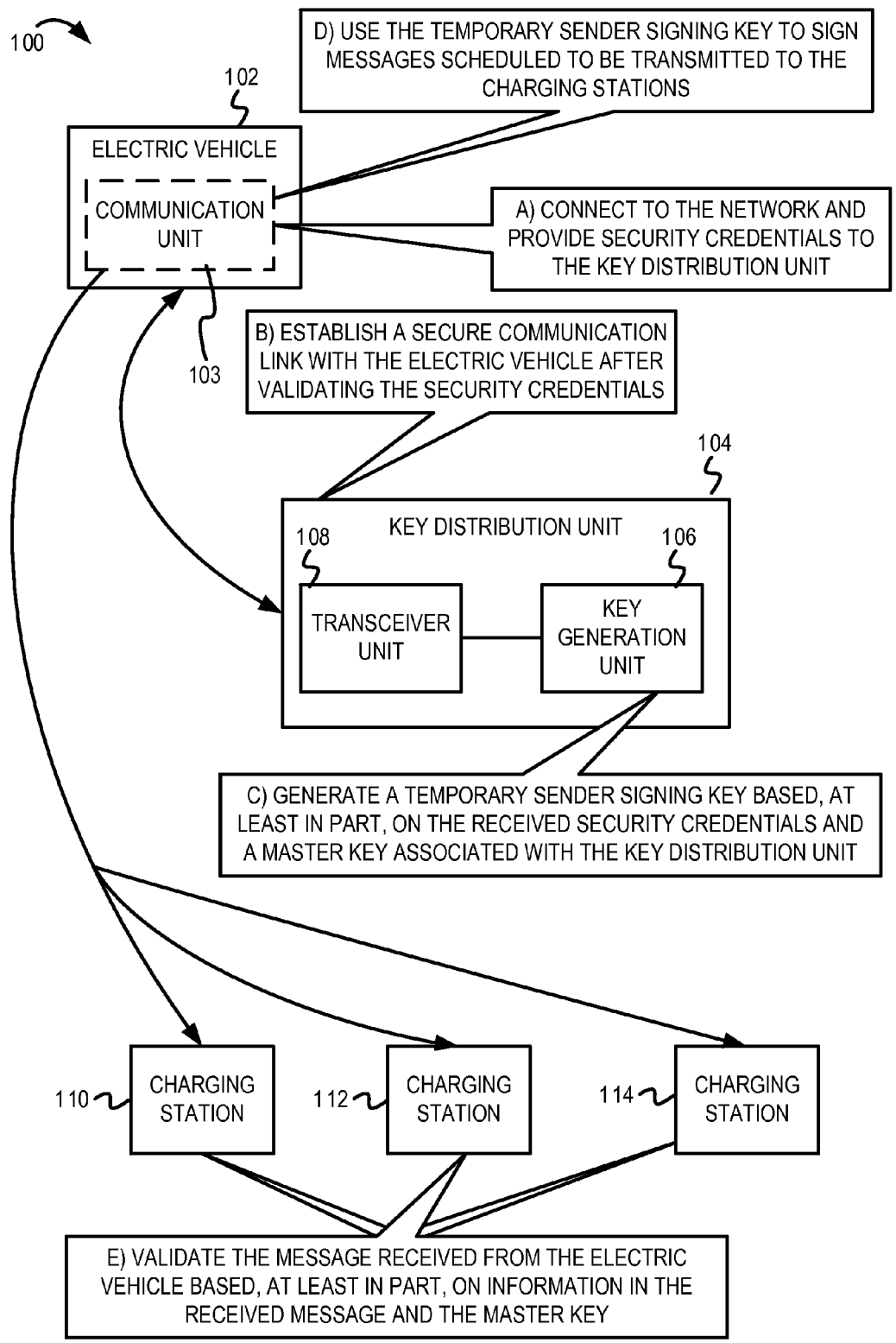
FIG. 1 is an example conceptual diagram of a broadcast authentication mechanism in a communication network.

The description that follows includes exemplary systems, methods, techniques, instruction sequences, and computer program products that embody techniques of the present inventive subject matter. However, it is understood that the described embodiments may be practiced without these specific details. For instance, although examples refer to executing operations (e.g., exchanging messages) for simultaneous client authentication and account authorization in a powerline communication (PLC) network, embodiments are not so limited. In other embodiments, the operations described herein for simultaneous client authentication and account authorization can be executed in other suitable shared communication networks (e.g., Ethernet over Coax (EoC), wireless local area networks (WLAN), such as IEEE 802.11 networks, etc.). In other instances, well-known instruction instances, protocols, structures, and techniques have not been shown in detail in order not to obfuscate the description.

When an electric vehicle connects to a charging facility that comprises multiple charging stations, an association between the electric vehicle and one of the charging stations may be established to enable the electric vehicle to receive power from the charging station. Because messages between the electric vehicle and the charging station may be exchanged (e.g., for authenticating the electric vehicle, etc.) via a shared communication medium, it may be possible for malicious users to intercept legitimate communications, transmit counterfeit messages, cause confusion at the charging station, and steal power intended for the electric vehicle. Traditional methods for authenticating broadcast messages transmitted by the electric vehicle rely on either the electric vehicle using a public key signature to sign each message or a key distributor providing a unique electric vehicle verification key to each of the charging stations over a secure connection. However, using a public key signature typically can require each charging station to perform expensive public key encryption/decryption operations to verify the authenticity of each received message. Also, distributing the electric vehicle verification key to each charging station can be costly in terms of the number of messages transmitted. Furthermore, the electric vehicle verification key may be transmitted to all the charging stations even though only a small subset of the charging stations may actually use the electric vehicle verification key to verify the messages from the electric vehicle.

In some embodiments, a broadcast authorization mechanism can be implemented in the charging facility to validate the electric vehicle and to ensure that the electric vehicle that transmitted a message is the same as the electric vehicle that is connected in the charging facility. In this embodiment, a key distributor and the charging stations of the charging facility can have a priori knowledge of a master key. The key distributor can determine a unique vehicle verification key for the electric vehicle based on a vehicle identifier (ID) and one or more other parameters (e.g., sequence number, timestamp, location, random number, etc.). The electric vehicle can sign messages (transmitted from the electric vehicle) using the vehicle verification key and can also provide the vehicle ID and the one or more other parameters (in the transmitted message). Based on the charging station's knowledge of the master key, the received vehicle ID, and the other received parameters, the charging station can derive the vehicle verification key and authenticate the received message. Such a broadcast authentication mechanism can enable secure communications between the electric vehicle and the charging stations, and can enable the charging stations to authenticate transmissions from the electric vehicle without expensive computations and without exchanging a large number of messages.

Additionally, whether an electric vehicle receives power at a charging facility may be contingent on two factors—1) identification of the charging station that should provide power to the electric vehicle ("service matching") and 2) authorization of a payment account ("account authorization") associated with the electric vehicle (e.g., determining whether the electric vehicle can pay for the received power). Identifying the charging station may be a local decision. However, authorizing the payment account may involve communicating with a remote account authorization unit (e.g., via the Internet) and this can incur communication latencies. Traditional authorization mechanisms are sequential where the charging station that should provide power to the electric vehicle is not identified until the payment account associated with the electric vehicle is authorized. Communication latencies and network latencies can result in the user of the electric vehicle having to wait for a significant amount of time between connecting the electric vehicle to the charging facility and the electric vehicle receiving power.

In some embodiments, a distributed authorization architecture can be implemented to minimize latency between the time instant when the electric vehicle connects to the charging facility and the time instant when the electric vehicle receives power. In accordance with the distributed authorization architecture, the service matching process and the account authorization process may be executed in parallel. In some embodiments, when the electric vehicle plugs into the charging facility, a local matching authorization unit can initiate the service matching process for the electric vehicle and can prompt a remote account authorization unit to initiate the account authorization process for the electric vehicle. The matching authorization unit can match the electric vehicle to one of the charging stations ("matched charging station"). Once the account authorization process is completed, the matching authorization unit can receive a service voucher (e.g., indicating whether the account was authorized, the type and amount of power that can be provided to the electric vehicle, etc.) from the account authorization unit. The matching authorization unit can provide the service voucher to the matched charging station and can cause the matched charging station to provide power to the electric vehicle in accordance with the service voucher. Such a distributed authorization architecture where the service matching process executes in parallel with the account authorization process can reduce the latency between the electric vehicle connecting to the charging facility and receiving electric power.

FIG. 1 is an example conceptual diagram of a broadcast authentication mechanism in a communication network 100. In FIG. 1, the communication network 100 comprises an electric vehicle 102, a key distribution unit 104, and charging stations 110, 112, and 114. The electric vehicle 102 comprises a communication unit 103. The communication unit 103 can implement protocols and functionality to enable the electric vehicle 102 to communicate with the key distribution unit 104 and one or more of the charging stations 110, 112, and 114 in the communication network 100. The key distribution unit 104 comprises a key generation unit 106 and a transceiver unit 108. In some embodiments, the communication network 100 can be a shared communication network (e.g., a powerline communication (PLC) network). In other embodiments, the communication network 100 can be other suitable types of networks (e.g., Ethernet over Coax (EoC), wireless local area networks (WLAN), such as IEEE 802.11 networks, etc.). All the charging stations 110, 112, and 114 and the key distribution unit 104 may be trusted entities with respect to each other. The key distribution unit 104 and the charging stations 110, 112, and 114 can be communicatively coupled using wireless communication protocols (e.g., WLAN, Bluetooth, etc.) or using wired communication protocols (e.g., PLC, Ethernet, etc.).

At stage A, the electric vehicle 102 connects to the communication network 100 and provides security credentials to the key distribution unit 104. In some embodiments, the electric vehicle 102 (e.g., the communication unit 103) may transmit a vehicle identifier (ID). In other embodiments, the electric vehicle 102 may also provide other suitable security credentials (e.g. an X.509v3 certificate with public keys bound to the vehicle ID) to the key distribution unit 104. In some embodiments, as depicted in FIG. 1, the key distribution unit 104 may be another network device (e.g., a managing network device or a coordinator device) that is distinct from the charging stations 110, 112, and 114. In another embodiment, one of the charging stations in the communication network 100 can be designated as the key distribution unit 104. As will be further described below, the key distribution unit 104 can use the vehicle ID and other suitable information to generate a signing key that can be used by the electric vehicle 102 for transmitting messages and by the charging stations for verifying the authenticity of messages received from the electric vehicle 102.

Figure 2:
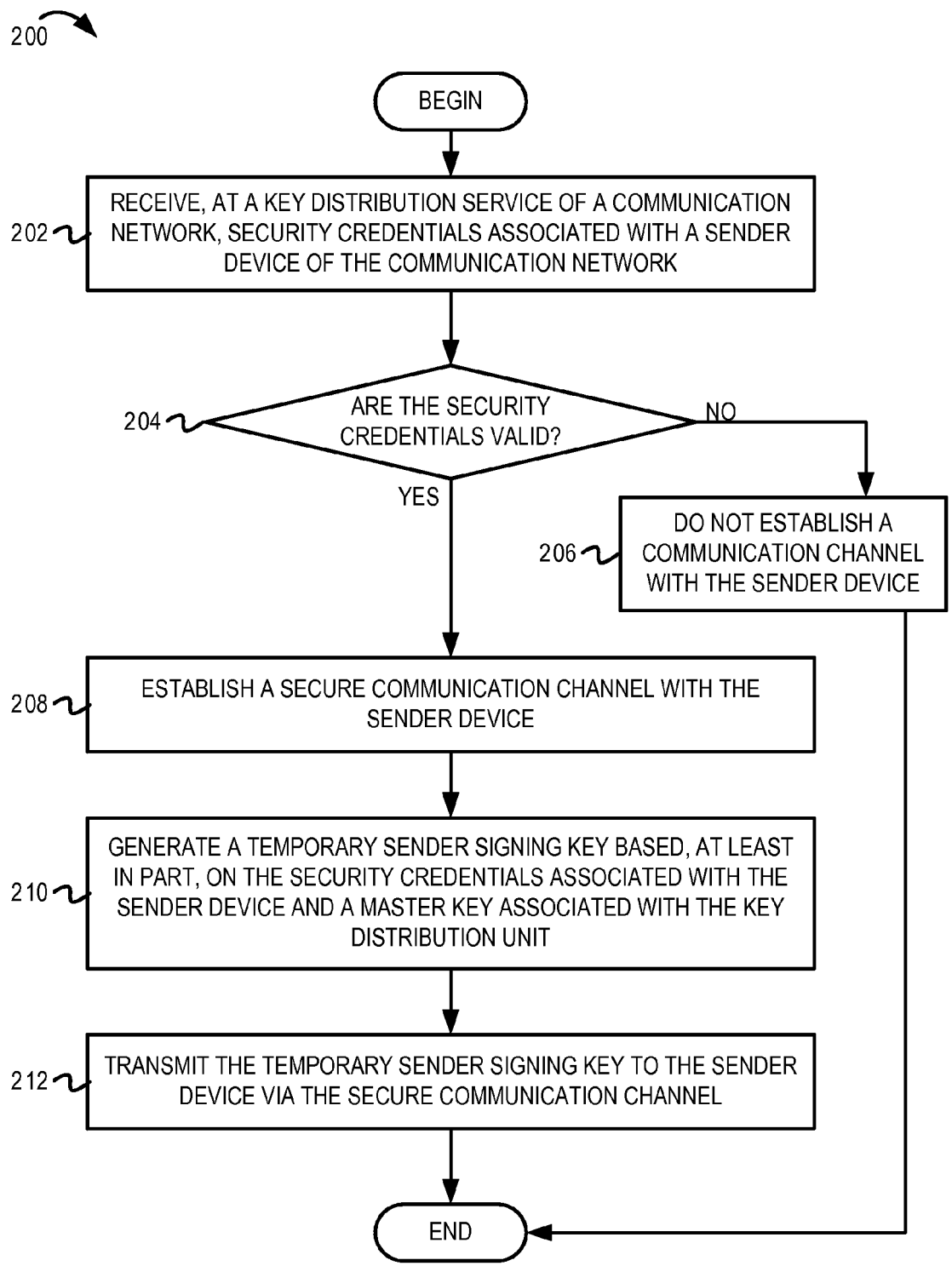
FIG. 2 is a flow diagram illustrating example operations of a key distribution unit executing the broadcast authentication mechanism.

At stage B, the key distribution unit 104 establishes a secure communication link with the electric vehicle 102 after validating the security credentials received from the electric vehicle 102, as will be further described in blocks 204-208 of FIG. 2.

At stage C, the key generation unit 106 generates a temporary sender signing key based, at least in part, on the received security credentials and a master key associated with the key distribution unit. For example, the key generation unit 106 can generate the temporary sender signing key based, at least in part, on the vehicle ID received at stage A and the master key. The master key may be known to the key generation unit 106 and to all the charging stations 110, 112, and 114 in the communication network 100. In one embodiment, the key generation unit 106 can generate the master key and can distribute the master key to all the charging stations 110, 112, and 114 in the communication network 100. In another embodiment, one of the charging stations 110 can generate the master key and can distribute the master key to the key generation unit 106 and to the other charging stations 112 and 114. In another embodiment, a subset of the charging stations (which may or may not include the key generation unit 106) may generate the master key. In another embodiment, the master key may be predetermined and provided (e.g., input by a network administrator during an installation process, hard-coded during a manufacturing process, etc.) to the key generation unit 106 and to the charging stations 110, 112, and 114.

In some embodiments, the key generation unit 106 can use a keyed one-way hash function (H) to generate the temporary sender signing key. The key generation unit 106 can use the master key as a key for the hash function. The input to the hash function can be the security credentials associated with the electric vehicle 102 (e.g., vehicle ID). In some embodiments, the input to the hash function can be a concatenation (or another combination) of the vehicle ID and one or more other parameters (e.g., a sequence number, a timestamp, a random value, a location identifier, etc.). The key generation unit 106 may increment the sequence number each time the key generation unit 106 distributes a new temporary sender signing key to the electric vehicle 102. The timestamp may include a start time and an end time for which the temporary sender signing key is valid. Combining the vehicle ID with one or more other parameters (e.g., the sequence number, the timestamp, the random value, the location identifier, etc.) can prevent spoofing attacks. It should be noted that the temporary sender signing key is unique to the electric vehicle, so that the charging stations 110, 112, and 114 can uniquely associate the messages sent by a particular electric vehicle with that electric vehicle.

At stage D, the electric vehicle 102 uses the temporary sender signing key to sign messages scheduled to be transmitted to the charging stations 110, 112, 114. The messages transmitted to the charging stations 110, 112, and 114 can include the vehicle ID and the one or more other parameters that were used by the key generation unit 106 to generate the temporary sender signing key (e.g., the sequence number, the timestamp, the random value, the location identifier, etc.). The electric vehicle 102 may not transmit the temporary sender signing key to the charging stations 110, 112, and 114. The electric vehicle 102 (e.g., the communication unit 103) can sign the message using the temporary sender signing key to enable the charging stations 110, 112, and 114 to identify and validate the electric vehicle 102. For example, each message can comprise a message authentication code (MAC) that is based on the temporary sender signing key and the content of the message. It should be noted that in some embodiments, the electric vehicle 102 (e.g., the communication unit 103) can broadcast the messages to all the charging stations 110, 112, and 114, as depicted in FIG. 1. In other embodiments, the electric vehicle 102 can broadcast the messages to one (or a subset) of the charging stations 110, 112, and 114.

At stage E, the charging station 110 can validate the message received from the electric vehicle 102 based, at least in part, on information in the received message and the master key. For example, the charging station 110 (and also the charging stations 112 and 114) can verify the message authentication code in the received message by performing the same operations as the key generation unit 106 (described in stage C) using the information provided by the electric vehicle 102 in the message (e.g., the vehicle ID, sequence number, the timestamp, the random value, the location identifier, etc.) and the master key known to the charging station 110. This can enable the charging station 110 to verify the signature in the received message without obtaining additional information from the key distribution unit 104.

FIG. 2 is a flow diagram ("flow") 200 illustrating example operations of a key distribution unit executing the broadcast authentication mechanism. The flow begins at block 202.

At block 202, a key distribution unit of a communication network receives security credentials associated with a network device ("sender device") that connects to the communication network. In one embodiment, the sender device can be a plug-in electric vehicle (PEV). With reference to the example of FIG. 1, the electric vehicle 102 can connect to the communication network 100 that comprises one or more charging stations 110, 112, and 114 to receive electric power from one of the charging stations. The electric vehicle 102 can then provide its security credentials (e.g., a sender ID) to the key distribution unit 104. The key distribution unit 104 may be one of the charging stations or may be distinct from the charging stations. The flow continues at block 204.

At block 204, it is determined whether the security credentials received from the sender device are valid. For example, the key distribution unit 104 can determine whether the security credentials received from the electric vehicle 102 are valid and whether the electric vehicle 102 can be authenticated. If the key distribution unit 104 determines that security credentials associated with the electric vehicle are valid, the flow continues at block 208. Otherwise, the flow continues at block 206.

At block 206, a communication channel is not established with the sender device if the security credentials associated with the electric vehicle are determined not to be valid. The flow 200 moves from block 204 to block 206 if the key distribution unit 104 is unable to authenticate the security credentials associated with the electric vehicle 102. In this instance, the key distribution unit 104 can determine not to establish a communication channel with the electric vehicle 102. If the key distribution unit 104 does not establish the communication channel with the electric vehicle 102, this can indicate that the electric vehicle 102 will not be permitted to receive power from any of the charging stations 110, 112, and 114 in the communication network 100. The key distribution unit 104 may also present a notification (e.g., audio, visual, and/or text notification) to the electric vehicle 102 indicating the inability to establish the communication channel with the electric vehicle 102. From block 206, the flow ends.

At block 208, a secure communication channel is established with the sender device if the security credentials associated with the electric vehicle are determined to be valid. The flow 200 moves from block 204 to block 208 after the key distribution unit 104 authenticates the security credentials associated with the electric vehicle 102. For example, the key distribution unit 104 can exchange one or more security handshake messages to establish the secure communication channel with the electric vehicle 102. As will be further described below, the key distribution unit 104 can exchange one or more messages with the electric vehicle 102 via the secure communication channel to generate a sender signing key that is unique to the electric vehicle 102. The electric vehicle 102 can then use the sender signing key to communicate with the charging stations 110, 112, and 114 in the communication network 100. The flow continues at block 210.

At block 210, a temporary sender signing key is generated based, at least in part, on the security credentials associated with the sender device and a master key associated with the key distribution unit. For example, the key generation unit 106 (of the key distribution unit 104) can generate the temporary sender signing key based, at least in part, on the sender ID received at block 202 and the master key. As described above, the key generation unit 106 and the charging stations 110, 112, and 114 may have a priori knowledge of the master key. As described above at stage C of FIG. 1, various embodiments can use employed to determine/provide the master key to the key generation unit 106 and the charging stations 110, 112, and 114. In some embodiments, the key generation unit 106 can use a keyed one-way hash function on the master key, the security credentials (sender ID) associated with the electric vehicle 102, and one or more other parameters (e.g., a sequence number, a timestamp, a random value, a location identifier, etc.) to generate the temporary sender signing key. Because the temporary sender signing key is unique to the electric vehicle 102, charging stations can uniquely associate the messages sent by a particular electric vehicle with that electric vehicle 102. The flow continues at block 212.

At block 212, the temporary sender signing key is transmitted to the sender device via the secure communication channel. For example, the key distribution unit 104 can transmit (e.g., via the transceiver unit 108) the temporary sender signing key to the electric vehicle 102 via the secure communication channel. In some embodiments, the key distribution unit 104 can also transmit the sequence number, the timestamp, the random value, the location identifier, and other parameters that were used to generate the temporary sender signing key. However, the key distribution unit 104 may not transmit the master key to the electric vehicle 102. As described above with reference to FIG. 1, the electric vehicle 102 can use the temporary sender signing key to sign all messages that it broadcasts to the charging stations 110, 112, and 114 so that the charging station (that receives the messages) can easily verify the authenticity of the received messages. From block 212, the flow ends.

Although FIGS. 1 and 2 describe the key distribution unit 104 transmitting the temporary sender signing key to the sender device (e.g., the electric vehicle 102) via an insecure medium over which a secure communication channel has been established, embodiments are not so limited. In other embodiments, the key distribution unit 104 can use an alternate secure communication channel, or a secure, out-of-band means of transmitting the temporary sender signing key to the sender device 102 to minimize the possibility of interception. The key distribution unit 104 may transmit the temporary sender signing key to the sender device 102 via a different communication medium, a separate waveguide, or a different communication band that is less susceptible to interception. In other embodiments, the key distribution unit 104 can use public key encryption techniques (or other suitable encryption techniques) to securely transmit the temporary sender signing key to the sender device 102.

Although stage D in FIG. 1 describes the sender device (e.g., the electric vehicle 102) transmitting the message including the sender ID and the other parameters used to generate the temporary sender signing key (e.g., the sequence number, the timestamp, the random number, the location, etc.), embodiments are not so limited. In some embodiments, the size of the message transmitted by the sender device 102 may not be large enough to accommodate all the parameters that were used to generate the temporary sender signing key. In this embodiment, the sender device 102 can transmit the parameters that were used to generate the temporary sender signing key (e.g., the sender ID, the sequence number, the timestamp, the random number, the location, etc.) in one or more separate initialization messages. The sender device 102 may only include the sender ID and sequence number in subsequent messages (along with the message content). The receiver device (e.g., the charging station 110) can derive the temporary sender signing key unique to the sender device 102 from the information provided in the initialization messages. For each sender device 102, the receiver device 110 can store the derived temporary sender signing key, the sender ID, and the sequence number. The receiver device 110 can look up the previously derived temporary sender signing key based on the sender ID and sequence number received in subsequent messages. The inclusion of the sequence number in the subsequent messages can ensure that the temporary sender signing key associated with the sender device 102 is current (e.g., since the sequence number is incremented each time the sender device 102 receives a new temporary sender signing key).

In some embodiments, the sender device (e.g., the electric vehicle 102) can also transmit a message counter in each message to minimize the possibility of replay attacks. The sender device 102 can also use the message counter to compute the message authentication code associated with the message. The receiver device (e.g., the charging station 110) can receive messages from the sender device 102 and can store the most recently received message counter value. The receiver device 110 can discard any received messages with a message counter value that is less than or equal to the largest message counter value received in a verified message from the sender device 102. In some embodiments, if the message from the sender device 102 includes a timestamp value and an expiration time, then the receiver device 110 can discard information about the temporary signing key (including the message counter, the sequence number, location, etc.) after the expiration time is reached.

In one example, the sender device 102 may be a plug-in electric vehicle (PEV) that connects to one of the charging stations (also known as an electric vehicle supply equipment or EVSE) in a charging facility. The PEV may connect to the charging station via a charging cable. The charging stations, the PEV, and the key distribution unit may be coupled via a powerline communication channel (or another suitable shared communication medium). Accordingly, multiple charging stations may receive the PEV's transmissions and may try to determine the identity of the PEV transmitting each message. In this example, the charging cable that connects the PEV and the charging station may have a control pilot line. The PEV and the charging station can exchange low-speed, secure communications via the control pilot line of the charging cable. In some embodiments, the key distribution unit 104 can provide the electric vehicle 102 with the temporary sender signing key via the control pilot line. Other communications can be conducted over the same control pilot line but in a different communication band, or over different lines (e.g., the power lines).

Although FIGS. 1 and 2 describe the key distribution unit 104 generating a temporary sender signing key based on a hash value of the sender ID and/or one or more other parameters (e.g., a sequence number, a location, a random number, a timestamp, etc.), embodiments are not so limited. In other embodiments, other suitable mechanisms can be used to generate the sender signing key. For example, the public key encryption methods can be used and the sender signing key may be a public encryption key. Furthermore, in some embodiments, the sender signing key may not be temporary. Instead, the sender signing key may be any suitable sender-specific key that is assigned to the sender device 102 when the sender device 102 connects to the communication network 100. The sender device 102 can then sign messages (prior to transmitting the messages) with the sender-specific key.

Figure 3:
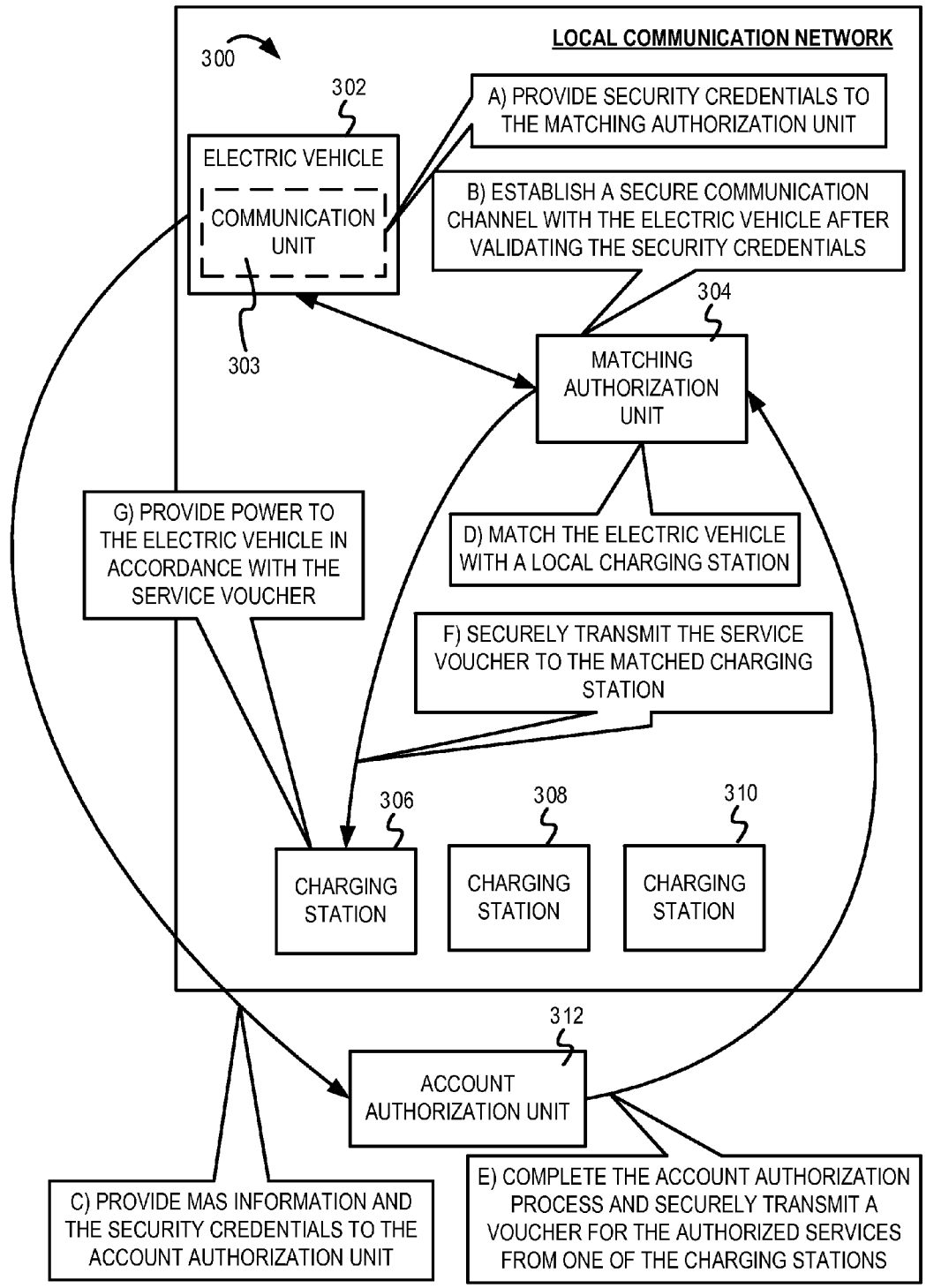
FIG. 3 is an example conceptual diagram of a distributed authentication mechanism in a communication network.

FIG. 3 is an example conceptual diagram of a distributed authentication mechanism in a communication network. In FIG. 3, a local communication network 300 comprises an electric vehicle 302, a matching authorization unit 304, and charging stations 306, 308, and 310. The local communication network 300 is also coupled to an account authorization unit 312 which may be at a remote location (e.g., on another communication network). The electric vehicle 302 comprises a communication unit 303. The communication unit 303 can implement protocols and functionality to enable the electric vehicle 302 to communicate with the matching authorization unit 304, the account authorization unit 312, and one or more of the charging stations 306, 308, and 310. In some embodiments, the local communication network 300 can be a shared communication network (e.g., a powerline communication network). All the charging stations 306, 308, and 310 and the matching authorization unit 304 may be trusted entities with respect to each other. The charging stations 306, 308, and 310 and the matching authorization unit 304 can be communicatively coupled using wireless communication protocols (e.g., WLAN, Bluetooth, etc.) or using wired communication protocols (e.g., PLC, Ethernet, etc.). The matching authorization unit 304 can perform three types of functions—1) authenticating the electric vehicle 302 and providing the electric vehicle 302 with a signing key for secure communication, 2) executing a service matching process for determining which charging station should provide power to the electric vehicle 302, and 3) accepting authorization information from the account authorization unit 312 on behalf of the electric vehicle 302 and forwarding this authorization to the charging station that was matched with the electric vehicle 302. Furthermore, it is noted that in some embodiments, as depicted in FIG. 3, the matching authorization unit 304 may be another network device (e.g., a managing network device or a coordinator device) that is distinct from the charging stations 306, 308, and 310. In another embodiment, one of the charging stations in the local communication network 300 can be designated as the matching authorization unit 304.

In some embodiments, after the electric vehicle 302 (e.g., a plug-in electric vehicle (PEV)) plugs into a charging facility (e.g., connects to a charging station or EVSE 306), a control pilot line transmission (CPLT) line associated with the electric vehicle 302 can be activated. The electric vehicle 302 (e.g., a PEV-EVSE matching protocol layer) can determine (e.g., via the CPLT line) that the CPLT line associated with the electric vehicle 302 is active. Additionally, the charging station 306 also can determine that an unmatched electric vehicle 302 is connected to the charging station 306 by detecting that the CPLT line associated with the electric vehicle 302 is activated. In some embodiments, the charging station 306 can transmit a notification to the matching authorization unit 304 indicating that an unmatched electric vehicle 302 is connected to the charging station 306. In some embodiments, the charging station 306 and the electric vehicle 302 can also exchange information needed for electric vehicle 302 to join the charging station's network. For example, the electric vehicle 302 could provide a vehicle identifier, information about supported communication protocols, etc. to the charging station 306. In one example, the charging station 306 can be associated with a powerline communication (PLC) network and can provide a charging station identifier, network information, supported PLC protocols (e.g., Green PHY, HomePlug AV, etc.), and other suitable information to enable the electric vehicle 302 to join the charging station's PLC network. After the electric vehicle 302 joins the charging station's network, the electric vehicle (e.g., upper protocol layers of the electric vehicle) can use dynamic host control protocol (DHCP) to determine IP addresses, router interfaces, domain name server (DNS) information, and other suitable information for communicating with the matching authorization unit 304 and the account authorization unit 312. As will be further described below in stages A-F, the electric vehicle 302 can communicate with the matching authorization unit 304 and the account authorization unit 312 in parallel to enable simultaneous service matching and account authorization.

At stage A, the electric vehicle 302 (e.g., the communication unit 303) provides security credentials to the matching authorization unit 304. In some embodiments, the electric vehicle 302 may transmit a customer ID. In other embodiments, the electric vehicle 302 may also provide other suitable security credentials bound to the customer ID (e.g. an X.509v3 certificate with public keys bound to the customer ID) to the matching authorization unit 304. In some embodiments, after the electric vehicle 302 connects to the network associated with the charging station 306, a PEV-EVSE matching protocol layer can prompt the upper protocol layers of the electric vehicle to communicate with the matching authorization unit 304. In one example, the electric vehicle 302 (e.g., PEV upper protocol layers) can use a known URL that references the matching authorization unit 304. In some embodiments, the URL used by the electric vehicle 302 to access the matching authorization unit 304 may be intercepted and locally redirected (to the matching authorization unit 304) by a network address translator or a local domain name server.

At stage B, the matching authorization unit 304 establishes a secure communication channel with the customer device (e.g., electric vehicle) 302 after validating the security credentials received from the electric vehicle 302. The matching authorization unit 304 can authenticate the electric vehicle 302 and establish a communication channel for securely communicating with the electric vehicle 302 based on the customer ID and other security credentials associated with the electric vehicle 302 (e.g., a public encryption key, a X.509v3 certificate with public keys bound to the customer ID).

At stage C, the electric vehicle 302 (e.g., the communication unit 303) receives the information associated with the matching authorization unit 304 ("MAS information") and provides the MAS information and the security credentials bound to the customer ID to the account authorization unit 312. In some embodiments, the MAS information provided by the matching authorization unit 304 can include MAS identity information, MAS location information, etc. The MAS identity information can be an identifier that is mapped to an IP address of the matching authorization unit 304. In some embodiments, the matching authorization unit 304 can also generate a temporary signing key that is unique to the electric vehicle 302 based, at least in part, on a secure hash of the customer ID, a master key, and one or more other parameters (e.g., a sequence number, a random number, a timestamp, etc.), as described above with reference to FIGS. 1-2. In addition to providing the MAS information to the electric vehicle 302, the matching authorization unit 304 may also provide the temporary signing key and the one or more parameters (except the master key) used for generating the temporary signing key to the electric vehicle 302, as described above in FIGS. 1-2. In this embodiment, the matching authorization unit 304 may comprise the key distribution unit 104 of FIG. 1 for generating the temporary signing key as described above in FIGS. 1-2. Alternately, the matching authorization unit 304 may itself execute the functionality described above in FIGS. 1-2 for generating the temporary signing key associated with the electric vehicle 302. Alternately, the matching authorization unit 304 may access a distinct key distribution unit 104 and can request the key distribution unit 104 to generate the temporary signing key for the electric vehicle 302. The matching authorization unit 304 can then provide this temporary signing key to the electric vehicle 302. In other embodiments, the matching authorization unit 304 may not generate the temporary signing key but may instead use a public encryption key for secure communication with the electric vehicle 302.

In response to receiving the MAS information, the electric vehicle 302 (e.g., the communication unit 303) can initiate the account authorization process with the account authorization unit 312 by using a known URL that references the account authorization unit. In some embodiments, the electric vehicle (or "customer device") 302 and the account authorization unit 312 can establish a secure communication channel using an X.509v3 certificate associated with the customer device 302. Additionally, the electric vehicle 302 can provide the customer ID and the MAS information to the account authorization unit 312 via the established secure communication channel. While the account authorization unit 312 is executing the account authorization process with the electric vehicle 302, the electric vehicle 302 can execute the service matching process with the matching authorization unit 304. In other words, as will be further discussed below, the account authorization process (e.g., for determining whether the payment account associated with the electric vehicle 302 has sufficient funds to pay for the electric power) can be performed in parallel with the service matching process (e.g., to identify the charging station that is best suited for providing the electric power to the electric vehicle 302). Since account authorization may not depend on which of the charging stations will provide electric power to the electric vehicle 302, the account authorization process can be executed in parallel with the service matching process. This can reduce latency between the electric vehicle 302 joining the local communication network 300 and receiving the electric power from the charging station.

At stage D, the matching authorization unit 304 executes the service matching process and matches the electric vehicle 302 with a charging station 306 in the local communication network 300. As described above, the account authorization unit 312 may be remote and communication between the account authorization unit 312 and the matching authorization unit 304 may incur long latencies. The service matching process may be executed locally, and therefore the matching authorization unit 304 may initiate the service matching process without account authorization (e.g., before the account authorization unit 312 determines whether the payment account has sufficient funds to pay for the services). Initiating the service matching process before account authorization process is completed can reduce latency between the electric vehicle 302 connecting to the network and receiving the electric power.

In some embodiments, as part of the service matching process, the matching authorization unit 304 may cause the electric vehicle 302 (e.g., the communication unit 303) to execute a signal level attenuation characteristics (SLAC) protocol with the local charging stations 306, 308, and 310. To enable the electric vehicle 302 to execute the SLAC protocol, the matching authorization unit 304 can transmit one or more SLAC parameters to the electric vehicle 302 (e.g., along with the MAS information at stage C). The SLAC parameters can indicate a number of service matching messages (e.g., sound tones) that should be transmitted to the local charging stations 306, 308, and 310, and a timeout interval for executing the SLAC protocol. The number of service matching messages may be determined based on a number of cables associated with the charging stations, a number of cable harnesses, a maximum number of switch states associated with the charging stations, the type of charging stations, the type of electric vehicle, local noise, and other such factors. In some embodiments, the number of service matching messages (as indicated by the matching authorization unit 304) can also take into consideration that some service matching messages may not be detected or missed. In some embodiments, the timeout interval for executing the SLAC protocol can be determined based, at least in part, on a number of electric vehicles in the local communication network 300, noise levels detected at the charging stations, cable configurations of the charging stations, etc. The matching authorization unit 304 can start a timer based on the timeout interval for SLAC protocol. In some embodiments, when the electric vehicle 302 receives the SLAC parameters from the matching authorization unit 304, the electric vehicle 302 can initiate operations for executing the SLAC protocol (i.e., without waiting for account authorization from the account authorization unit 312). The electric vehicle 302 can transmit one or more initialization messages (e.g., using multi-network broadcast communications (MNBC)) to indicate that operations for the SLAC protocol will begin. These initialization messages can also include the timeout interval and the number of service matching messages that will be transmitted in accordance with the SLAC protocol. The electric vehicle 302 can transmit the service matching messages using multi-network broadcast communications. In some embodiments, if the matching authorization unit 304 generated a unique signing key for the electric vehicle 302 (in accordance with the operations of FIGS. 1-2), the service matching messages can include a message authentication code that is generated based on a one-way hash of the message content, the signing key, a sequence number, and a message counter. The value of the message counter may be decremented as each service matching message is transmitted. Each service matching message can also include the customer ID, the sequence number, the message counter, and other parameters that were used to generate the signing key. It should be noted that, in other embodiments, the service matching messages may be signed using a key based on a public certificate, or another suitable vehicle-specific key. In some embodiments, after the electric vehicle 302 transmits a first service matching message, the electric vehicle 302 may wait for a predetermined time interval before transmitting a second service matching message.

Each charging station 306 that receives the service matching message can determine signal level information (or attenuation information) based on the received service matching message and a time instant at which the service matching message was received (e.g., a receive timestamp). In some embodiments, only the charging stations 306 that are not currently matched with another electric vehicle may process the received service matching messages. The charging station 306 can use the information received in the service matching message in conjunction with the master key to derive the signing key associated with the electric vehicle 302. The charging station 306 can then use the signing key to authenticate the received service matching messages. After the last service matching message is received (or after the timeout interval expires), the charging station 306 can provide SLAC results for each authenticated service matching message (e.g., the signal level information, the attenuation information, the receive timestamp, etc.) to the matching authorization unit 304. After the matching authorization unit 304 receives the SLAC results from all the charging stations (or after the timeout interval elapses), the matching authorization unit 304 selects one of the charging stations with the best performance to provide electric power to the customer device 302. For example, the matching authorization unit 304 may analyze the SLAC results and may determine that the charging station 306 that received the service matching message with the highest signal level should provide electric power to the electric vehicle 302. As another example, the matching authorization unit 304 may determine that the charging station 306 that received the service matching message with the smallest latency should provide electric power to the electric vehicle 302. However, in some implementations, the matching authorization unit 304 may not notify the charging station 306 of the results of the service matching process until the account authorization process is completed and the payment account associated with the electric vehicle 302 has been authorized.

At stage E, the account authorization unit 312 completes the account authorization process and securely transmits a service voucher for the authorized services from one of the charging stations. The account authorization process can comprise operations for authenticating a customer account (e.g., a payment account) associated with the electric vehicle 302 (e.g., for which a user of the electric vehicle 302 has appropriate access permissions). The account authorization unit 312 can verify the account associated with the electric vehicle 302 based on the customer ID and other security credentials associated with the electric vehicle (e.g., an X.509v3 certificate with public keys bound to the customer ID). As part of the account authorization process, it may also be determined whether the payment account associated with the electric vehicle 302 has sufficient funds to provide compensation for the electric power that will be provided by one of the charging stations. After completing the account authorization process, the account authorization unit 312 can transmit (to the matching authorization unit 304) a service voucher including the results of the account authorization process.

The service voucher generated by the account authorization unit 312 can indicate whether the electric vehicle 302 has the appropriate authorization to receive the electric power, according the account characteristics and the permissions. The service voucher can also indicate limitations on the service (e.g., how much electric power, etc.) that can be provided be the charging station based on characteristics and state of the account, characteristics of the charging station, characteristics of the electric vehicle 302, and the permissions associated with the account. The service voucher may also comprise the customer ID associated with the electric vehicle 302. In some embodiments, the service voucher can indicate a deadline by which the service matching process should be completed. The service voucher may expire (and the electric vehicle 302 may no longer be able to receive power/services) after this deadline elapses. In some embodiments, the service voucher may also include an authorized maximum amount of time, money, energy. For example, the service voucher may indicate that 100 kWh of power should be provided to the electric vehicle 302, that an amount of electric power equivalent to $10 should be provided to the electric vehicle 302, etc.

At stage F, the matching authorization unit 304 securely transmits the service voucher to the matched charging station 306. The matching authorization unit 304 can securely transmit the service voucher (or another suitable indication of electric vehicle authorization) to the matched charging station 306 when the matching authorization unit 304 has the service voucher for the electric vehicle 302 (received at stage E after the account authorization process is completed) and knowledge of the matched charging station 306 (after completing the service matching process at stage D). Additionally, the matching authorization unit 304 may also transmit a notification to the electric vehicle 302 identifying the matched charging station 306 that will provide the electric power.

At stage G, the matched charging station 306 provides the authorized amount of electric power to the electric vehicle 302 in accordance with the service voucher. For example, the matched charging station 306 can close one or more power relays and provide the authorized amount of power to the electric vehicle 302. In some embodiments, the matched charging station 306 can also provide a notification to the matching authorization unit 304 to indicate that power is being provided to the electric vehicle 302. In some embodiments, after the electric vehicle 302 detects receipt of power from the matched charging station 306, the electric vehicle 302 can transmit an acknowledgement message to the matched charging station 306. In some embodiments, if the matched charging station 306 does not receive an acknowledgement within a predetermined acknowledgment time interval, the matched charging station 306 can suspend power transfer to the electric vehicle 302 and can notify the matching authorization unit 304 of a potential error. After receiving the acknowledgement, the matched charging station 306 and/or the electric vehicle 302 may present one or more audio/visual notifications (e.g., a charging light, a beeping sound, etc.) to notify the user that the service is being provided to the electric vehicle 302 (e.g., that electric vehicle 302 is being charged). The charging station 306 can enforce the limitations (if any) specified in the service voucher and can provide power to the electric vehicle 302 in accordance with the service voucher. The received service voucher can indicate, to the matched charging station 306, that the owner of the electric vehicle 302 will provide compensation for authorized services (indicated in the service voucher) provided by the charging station 306.

In some embodiments, as described above, if the matched charging station 306 does not receive an acknowledgement from the electric vehicle 302 within a predetermined time interval (after the matched charging station 306 starts providing power), the matched charging station 306 can stop providing power to the electric vehicle 302. In other embodiments, the matched charging station 306 can stop providing power to the electric vehicle 302 if the matched charging station 306 detects that the electric vehicle 302 was unplugged. In another embodiment, the matched charging station 306 can stop providing power to the electric vehicle 302 if the matched charging station 306 detects that an authorized limit (specified in the service voucher) was reached. In another embodiment, the matched charging station 306 can stop providing power to the electric vehicle 302 in response to the electric vehicle 302 requesting power termination.

It should be understood that although FIG. 3 describes the matching authorization unit 304 as a single entity that authenticates the electric vehicle 302, determines a charging station 306 should provide the electric vehicle 302 with power, and forwards authorization information received from account authorization unit 312 to the matched charging station 306, embodiments are not so limited. In other embodiments, the matching authorization unit 304 can be implemented in a distributed format. For example, the matching authorization unit 304 can include three (or more) distinct sub-units each of which execute one function of the matching authorization unit 304. For example, the first sub-unit can authenticate the electric vehicle 302 and provide the electric vehicle 302 with the MAS information and/or a signing key. The second sub-unit can determine, during the service matching process, which charging station 306 should provide power to the electric vehicle 302. The third sub-unit can accept authorization information from the account authorization unit 312 on behalf of the electric vehicle 302 and forward this authorization to the charging station 306 that was matched with the electric vehicle 302.

In some embodiments, as described in FIG. 3, the matching authorization unit 304 can determine which charging station should be matched with the electric vehicle 302. However, in other embodiments, some/all of the charging stations can determine (in a distributed manner) which charging station should be matched with the electric vehicle 302. For example, in response to receiving the service matching messages from the electric vehicle 302, the charging stations 306, 308, and 310 can determine the signal/attenuation level and communicate this information to a designated charging station 310. The designated charging station 310 can determine which of the charging stations 306, 308, or 310 should be matched with the electric vehicle 302.

In some embodiments, as described with reference to FIG. 3, the service voucher indicating account authorization can be provided to the matching authorization unit 304. Providing the service voucher to the matching authorization unit 304 (instead of waiting until the appropriate charging station is identified) can minimize delay and can ensure that the electric vehicle 302 receives the service (if authorized) as soon as possible. In other embodiments, however, the service voucher indicating account authorization can be provided to another suitable designated device (e.g., a predetermined charging station). In other embodiments, the service voucher indicating account authorization can be provided directly to the electric vehicle 302. In this embodiment, the matching authorization unit 304 may also provide a notification of the matched charging station to the electric vehicle 302. The electric vehicle 302 may then transmit the service voucher to the matched charging station.

Figure 4:
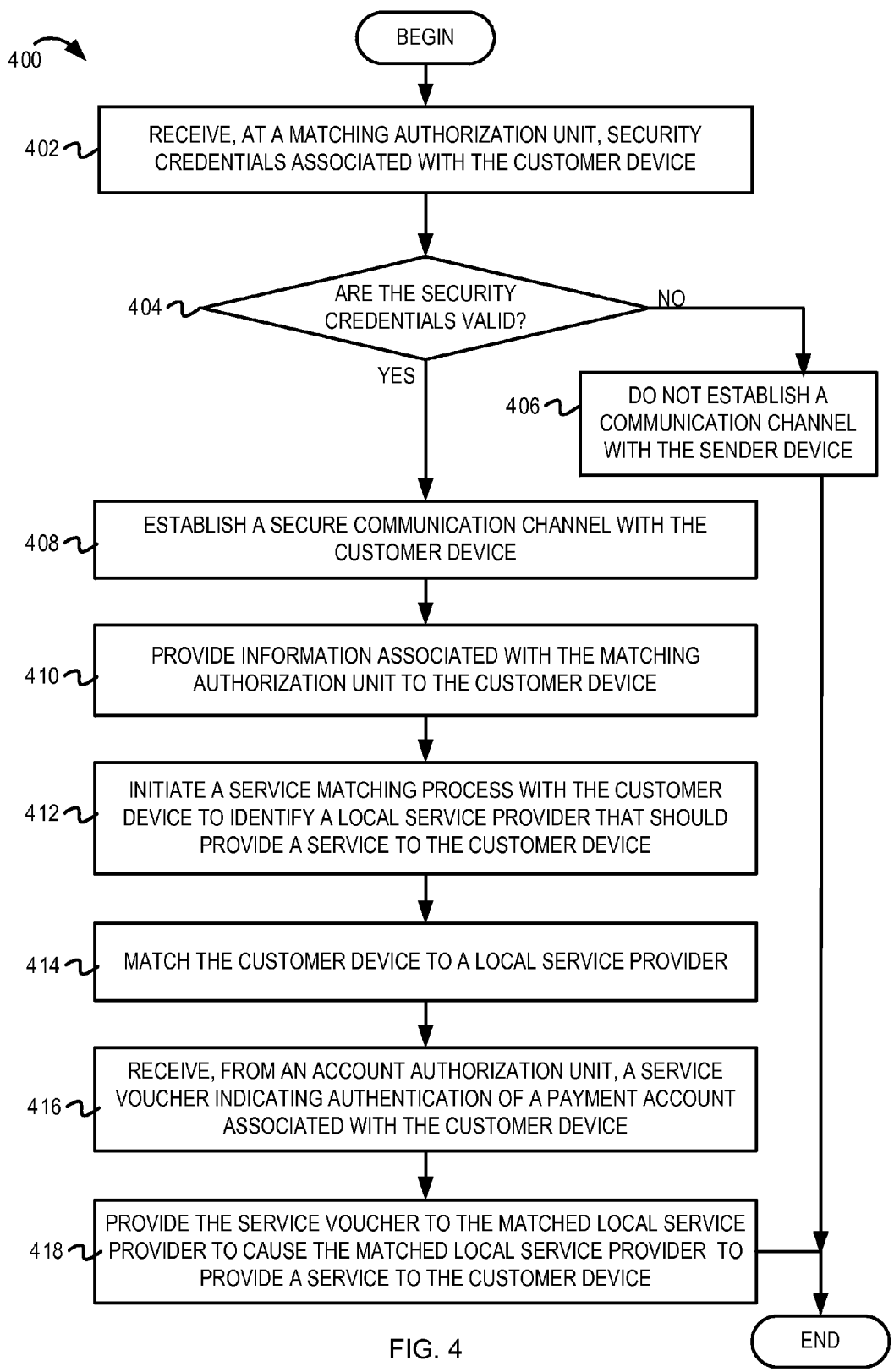
FIG. 4 is a flow diagram illustrating example operations of a matching authorization unit in a distributed client authentication and service authorization environment.

FIG. 4 is a flow diagram 400 illustrating example operations of a matching authorization unit in a distributed client authentication and service authorization environment. The flow begins at block 402.

At block 402, a matching authorization unit of a local communication network receives security credentials associated with a customer device that connects to the local communication network. With reference to the example of FIG. 3, the customer device can be an electric vehicle 302 (e.g., a plug-in electric vehicle (PEV)). The customer device 302 can connect to the local communication network 300 that comprises one or more local service providers (e.g., the charging stations 306, 308, and 310) to receive power from one of the charging stations. The customer device 302 can then provide its security credentials (e.g., a customer ID) to the matching authorization unit 304. In some embodiments, one of the local service providers 310 in the local communication network 300 can be designated as the matching authorization unit 304. In another embodiment, the matching authorization unit 304 may be another network device that is distinct from the local service providers 306, 308, and 310. The flow continues at block 404.

At block 404, it is determined whether the security credentials received from the customer device are valid. For example, the matching authorization unit 304 can determine whether the security credentials received from the electric vehicle 302 are valid and whether the electric vehicle 302 can be authenticated. If the matching authorization unit 304 determines that security credentials associated with the customer device are valid, the flow continues at block 408. Otherwise, the flow continues at block 406.

At block 406, a communication channel is not established with the customer device if the security credentials received from the customer device are determined not to be valid. For example, the flow 400 moves from block 404 to block 406 if the matching authorization unit 304 is unable to authenticate the security credentials associated with the electric vehicle 302. As described above with reference to block 206 of FIG. 2, the matching authorization unit 304 can determine not to establish a communication link with the electric vehicle 302 and can prevent the electric vehicle 302 from receiving power from any of the charging stations 306, 308, and 310. From block 406, the flow ends.

At block 408, a secure communication channel is established with the customer device if the security credentials received from the customer device are determined to be valid. The flow 400 moves from block 404 to block 408 after the matching authorization unit 304 authenticates the security credentials associated with the customer device. For example, as described above with reference to block 208 of FIG. 2, the matching authorization unit 304 can establish a secure communication channel with the electric vehicle 302. The flow continues at block 410.

At block 410, information associated with the matching authorization unit ("MAS information") is provided to the customer device. For example, the matching authorization unit 304 can transmit the MAS information (e.g., identity, location, etc.) to the customer device 302. In some embodiments, the matching authorization unit 304 may execute operations that are similar to the key distribution unit 104 of FIGS. 1-2 to determine the signing key unique to the customer device 302. For example, the matching authorization unit 304 and the local service providers (e.g., the charging stations) may have a priori knowledge of a secret master key. In this embodiment, the matching authorization unit 304 can generate a temporary signing key based on the master key, the customer ID and one or more suitable parameters (e.g., a sequence number, a timestamp, a random number, a location, etc.). Any messages transmitted by the customer device 302 can be signed using this temporary signing key for identification of the customer device 302. In another embodiment, the matching authorization unit 304, the customer device 302, and the local service providers 306, 308, 310 can use public key encryption to exchange messages during the local service matching process. For example, the customer device 302 can connect to the local communication network 300 and provide its public certificate to all the local service providers 306, 308, 310 and to the matching authorization unit 304. The customer device 302 can use a key based on the public certificate to sign all messages transmitted by the customer device 302. The matching authorization unit 304 (and the local service providers 306, 308, 310) can validate the received message based on this key. The flow continues at block 412.

At block 412, the matching authorization unit initiates a service matching process with the customer device. As described above with reference to stage D of FIG. 3, the matching authorization unit 304 can execute the service matching process in conjunction with the customer device 302 and the local service providers 306, 308, and 310. The flow continues at block 414.

At block 414, the customer device is matched to one of the local service providers. In other words, after the service matching process is completed, the matching authorization unit 304 identifies one of the local service providers 306 that should provide services to the customer device 302. The matching authorization unit 304 may identify the matched local service provider based on availability of local service providers, proximity of the local service providers to the customer device, compatibility of the local service providers with the customer device, etc. In one example, after the matching process is completed, the matching authorization unit 304 identifies one of the charging stations 306 that is matched to the electric vehicle 302 and that will provide power to the electric vehicle 302. The flow continues at block 416.

At block 416, a service voucher that indicates authentication of a payment account associated with the customer device is received from an account authorization unit. For example, after the account authorization unit 312 of FIG. 3 completes the account authorization process (using the MAS information and the security credentials associated with the customer device 302), the account authorization unit 312 can securely transmit the service voucher to the matching authorization unit 304. The service voucher can indicate an account balance available to the customer device 302 and authorized services that can be provided by the charging stations. In some embodiments, the service voucher may be a notification from the account authorization unit 312 that indicates that the payment account associated with the customer device 302 comprises sufficient funds to pay for the service. The flow continues at block 418.

At block 418, the service voucher is provided to the matched local service provider to cause the matched local service provider to provide a service to the customer device.

The matching authorization unit 304 can securely transmit the service voucher to the matched local service provider 306 when the matching authorization unit 304 has the service voucher for the customer device 302 (received at block 416 after the account authorization process is completed) and knowledge of the matched local service provider 306 (after completing the service matching process at block 414). The service voucher can also indicate limitations on the service that can be provided, based on characteristics and state of the payment account, characteristics of the local service provider, characteristics of the customer device, and permissions the customer has for the account. As described above with reference to FIG. 3, after the matched local service provider 306 receives the service voucher, the matched local service provider 306 can provide the service (e.g., an authorized amount of power) to the customer device 302 in accordance with the received service voucher. From block 418, the flow ends.

In some embodiments, in addition to providing the service voucher to the matched charging station 306, the matching authorization unit 304 can also cause the matched charging station 306 to close its power relays on an appropriate power cable and to provide power to the electric vehicle 302. The matching authorization unit 304 can receive an acknowledgement message from the electric vehicle 302 after the matched charging station 306 begins providing power to the electric vehicle 302. The matching authorization unit 304 can forward the acknowledgement message received from the electric vehicle 302 to the matched charging station 306. Furthermore, it is noted that if the account authorization unit 312 indicates to the matching authorization unit 304 that the account associated with the electric vehicle 302 is not valid (e.g., that the account does not have sufficient funds), the matching authorization unit 304 can notify the matched charging station 306 to not provide power to the electric vehicle 302. The matching authorization unit 304 may also prompt the electric vehicle 302 to disconnect from the local communication network 300. In some embodiments, if the matching authorization unit 304 receives a notification from the charging station 306 that the electric vehicle 302 is no longer in the local communication network 300, the matching authorization unit 304 can forward this notification to the account authorization unit 312.

Figure 5:
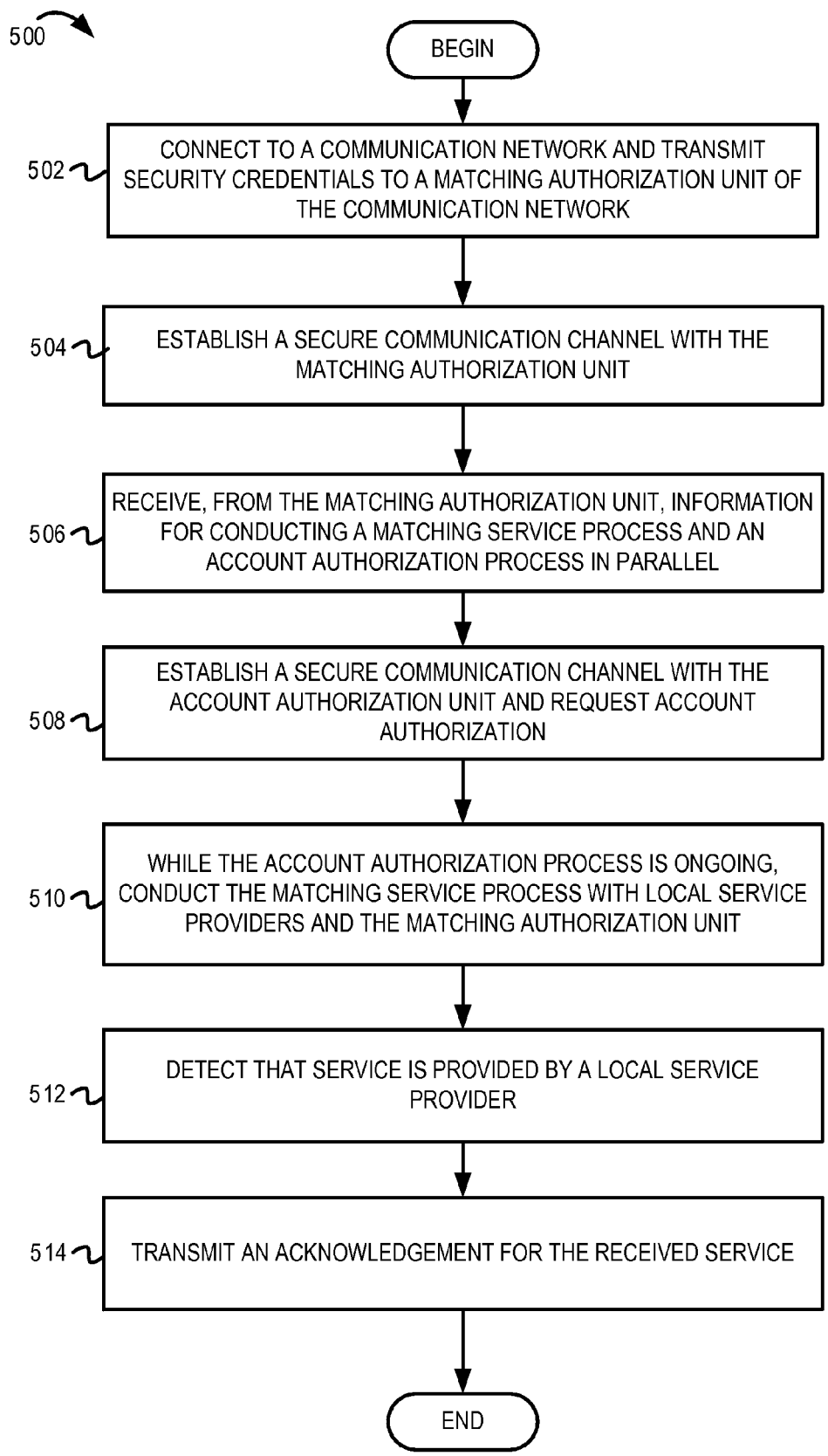
FIG. 5 is a flow diagram illustrating example operations of a customer device in a distributed client authentication and service authorization environment.

FIG. 5 is a flow diagram 500 illustrating example operations of a customer device in a distributed client authentication and service authorization environment. The flow 500 begins at block 502.

At block 502, a customer device connects to a communication network and transmits security credentials to a matching authorization unit of the communication network. In one embodiment, the customer device can be an electric vehicle. As described above in FIG. 3, the electric vehicle 302 can detect activity on a pilot line after connecting to a charging station of a charging facility (e.g., the local communication network 300). In some embodiments, after detecting that the pilot line is activated, the electric vehicle 302 (e.g., a communication unit 303 of the electric vehicle 302) can transmit "join request" messages on the communication network. The electric vehicle 302 can receive a "join confirmation" message from one of the charging stations in the communication network. In response to receiving the "join confirmation" message from a charging station, the electric vehicle can join a network associated with that charging station. In some embodiments, the customer device 302 can then transmit identification information (e.g., a customer ID), an X.509v3 certificate with public keys bound to the customer ID, etc. to the matching authorization unit 304 of the local communication network 300. The flow continues at block 504.

At block 504, a secure communication channel is established with the matching authorization unit. For example, after the customer device 302 transmits its security credentials to the matching authorization unit 304, the matching authorization unit 304 can authenticate the customer device 302 and can establish the secure communication channel with the customer device 302. In some embodiments, the secure communication link can be established using an X.509v3 certificate that includes an identifier of the customer device 302. The flow continues at block 506.

At block 506, information for conducting the matching service process and the account authorization process in parallel are received from the matching authorization unit. For example, in one embodiment, the customer device 302 (e.g., the communication unit) can receive a unique signing key (generated by the matching authorization unit 304 as described above in FIGS. 1-4) and other parameters that were used for generating the signing key. Additionally, the electric vehicle may also receive MAS information (e.g., an identifier or location of the matching authorization unit 304). The customer device 302 may also receive one or more SLAC parameters (e.g., a number of service matching messages that should be transmitted to each local service provider, a maximum time interval for conducting the service matching process, etc.) to enable the customer device 302 to execute the service matching process in conjunction with the matching authorization unit 304. The flow continues at block 508.

At block 508, a secure communication channel is established with the account authorization unit and account authorization is requested. For example, the customer device 302 (e.g., the communication unit) can transmit its customer ID and the MAS information to the account authorization unit 312. As described above in FIG. 3, the account authorization unit 312 can authenticate the customer device 302 and can establish the secure communication channel with the customer device 302. In some embodiments, the secure communication channel can be established using an X.509v3 certificate that includes an identifier of the customer device 302. The customer device 302 can also request that the account associated with the customer device 302 be authorized and that the authorization results be provided to the matching authorization unit 304. The flow continues at block 510.

At block 510, while the account authorization process is ongoing, the matching service process is conducted with the local service providers and the matching authorization unit. As described above in FIG. 3, the customer device 302 (e.g., the communication unit 303) can transmit one or more service matching messages to each of the local service providers 306, 308, and 310 in the local communication network 300. In some embodiments, the customer device 302 can sign each service matching message with the signing key (or another suitable key) received at block 506 and can also provide one or more parameters (if necessary) that were used to generate the signing key. As described above with reference to FIGS. 3-4, the matching authorization unit 304 can analyze signal/attenuation information received from the local service providers (based on the service matching messages) and can identify one of the local service providers that should provide service to the customer device. The flow continues at block 512.

At block 512, it is detected that service is provided by a local service provider. For example, the electric vehicle 302 (e.g., the communication unit) can detect that power is being provided by one of the charging stations 306. The flow continues at block 514.

At block 514, an acknowledgement for the received service is transmitted. For example, the electric vehicle 302 (e.g., the communication unit 303) can transmit the acknowledgement for the received power (e.g., to the local service provider 306 and/or to the matching authorization unit 304). From block 514, the flow ends.

It should be understood that FIGS. 1-5 are examples meant to aid in understanding embodiments and should not be used to limit embodiments or limit scope of the claims. Embodiments may comprise additional circuit components, different circuit components, and/or may perform additional operations, fewer operations, operations in a different order, operations in parallel, and some operations differently. In some embodiments, in order for the account authorization process to execute in parallel with the service matching process, it may be required that the customer device 302 identified in the service matching process be inextricably bound to the customer device 302 identified in the account authorization process. In this embodiment, a unique customer ID that is bound to a public key in a public key certificate (e.g., X.509v3), signed by a trusted certificate authority (CA) can be used for customer identity binding. The customer ID in a certificate used by the customer device 302 in the service matching process (e.g., to obtain the signing key, the MAS information, etc.) can be compared against the customer ID used by the customer device to obtain account authorization from the account authorization unit 312, to ensure that they are identical.

It is also noted that although examples refer to simultaneous client authentication and account authorization in an electric vehicle charging environment, embodiments are not so limited. In other embodiments, the operations described herein for simultaneous client authentication and account authorization can be extended to other suitable operating environments (e.g., gaming environments).

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
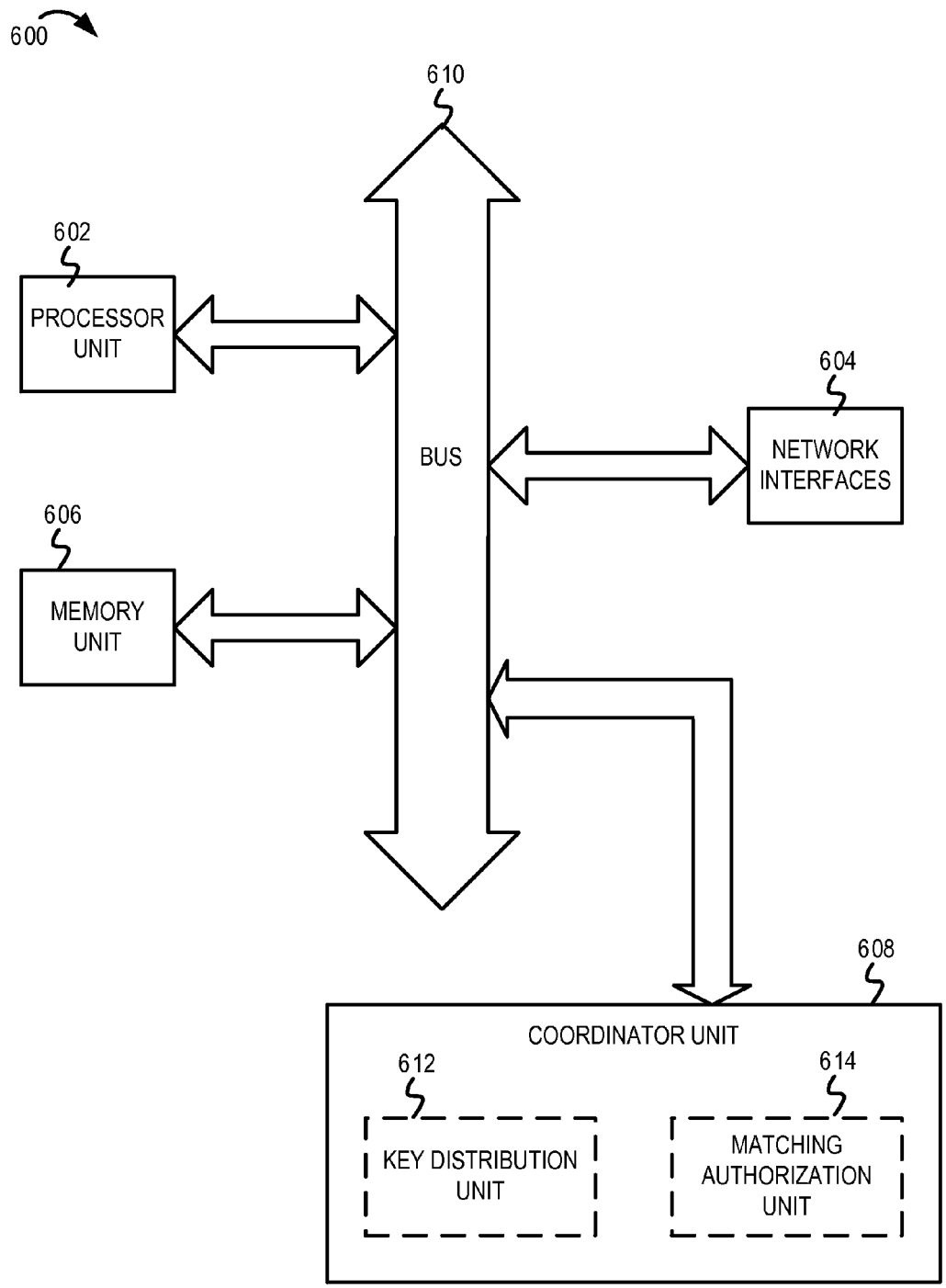
FIG. 6 is a block diagram of one embodiment of an electronic device including a broadcast authentication and service matching mechanism in a communication network.

FIG. 6 is a block diagram of one embodiment of an electronic device 600 including a broadcast authentication and service matching mechanism in a communication network. In some implementations, the communication network may be a public charging facility and the electronic device 600 may be a charging station or another suitable coordinator unit in the charging facility. In other implementations, the electronic device 600 may be a desktop computer, a workstation, a server computer, or other electronic systems with wired communication capabilities (e.g., powerline communication capabilities) and/or wireless communication capabilities (e.g., WLAN communication capabilities). The electronic device 600 includes a processor unit 602 (possibly including multiple processors, multiple cores, multiple nodes, and/or implementing multi-threading, etc.). The electronic device 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 600 also includes a bus 610 (e.g., PCI, ISA, PCI-Express, HyperTransport®, InfiniBand®, NuBus, AHB, AXI, etc.), and network interfaces 604 that include at least one of a wireless network interface (e.g., a Bluetooth interface, a WLAN 802.11 interface, a WiMAX interface, a ZigBee® interface, a Wireless USB interface, etc.) and a wired network interface (e.g., an Ethernet interface, a powerline communication interface, etc.).

The electronic device 600 also includes a coordinator unit 608. The coordinator unit 608 comprises a key distribution unit 612 and a matching authorization unit 614. The key distribution unit 612 can execute operations described above with reference to FIGS. 1-2 to generate a signing key for a sender device (e.g., an electric vehicle) for easier verification of messages transmitted by the sender device. The matching authorization unit 614 can execute operations described above with reference to FIGS. 3-4 to A) authenticate a customer device (e.g., an electric vehicle), B) provide the customer device with information to enable the customer device 302 to execute the service matching process and the account authorization process in parallel, C) execute the service matching process for determining which service provider should service the customer device, D) accept authorization information from a remote account authorization unit on behalf of the customer device, and E) forward this authorization to the local service provider that was matched with the customer device. It is noted that although FIG. 6 depicts the coordinator unit 608 as comprising both the key distribution unit 612 and the matching authorization unit 614, embodiments are not so limited. In other embodiments, the coordinator unit 608 may only comprise the key distribution unit 612 that is configured to execute operations described above in FIGS. 1-2 for broadcast authorization of the sender device. In other embodiments, the coordinator unit 608 may comprise the matching authorization unit 614 that is configured to execute functionality described above in FIGS. 3-4. In this embodiment, the matching authorization unit 614 may or may not execute the functionality of the key distribution unit 612.

Any one of these functionalities may be partially (or entirely) implemented in hardware and/or on the processor unit 602. For example, the functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). The processor unit 602, the memory unit 606, and the network interfaces 604 are coupled to the bus 610. Although illustrated as being coupled to the bus 610, the memory unit 606 may be coupled to the processor unit 602.

While the embodiments are described with reference to various implementations and exploitations, it will be understood that these embodiments are illustrative and that the scope of the inventive subject matter is not limited to them. In general, a mechanism for secure client authentication and service authorization in a shared communication network as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   establishing, by a processor of a managing network device, a secure communication channel between a client network device and the managing network device of a communication network based, at least in part, on a client identifier of the client network device;
   determining, based at least in part on a service environment characteristic, a number of service matching messages to be transmitted during a service matching process, wherein the service environment characteristic includes at least one member of a group consisting of a number of cables, a number of cable harnesses, and a number of switch states;
   causing the client network device to perform an account authorization process with an accounting network device contemporaneously with the service matching process, wherein the service matching process includes determining a matching service provider based, at least in part, on a service matching message of the service matching messages;
   matching the client network device with the matching service provider;
   receiving a service voucher at the managing network device from the accounting network device authorizing the matching service provider to service the client network device; and
   transmitting the service voucher to the matching service provider to allow the matching service provider to service the client network device.

2. The method of claim 1, further comprising:
   generating, at the managing network device, a client key that is unique to the client network device based, at least in part, on the client identifier and a master key known to the managing network device and the matching service provider;
   providing the client key from the managing network device to the client network device via the secure communication channel to allow the client network device to securely communicate with the matching service provider;

receiving, from the matching service provider, a message that indicates a signal level detected at the matching service provider in response to the service matching message; and selecting the matching service provider based, at least in part, on the matching service provider having a highest detected signal level.

3. The method of claim 2, wherein the client key is a temporary key and is generated based, at least in part, on the master key, the client identifier, and at least one member of a group consisting of a sequence number, a random number, a start/end timestamp, a lifetime duration, a message counter, and a location identifier.

4. The method of claim 2, wherein the client key is a public encryption key.

5. The method of claim 1, wherein the client identifier is authenticated by the managing network device and by the accounting network device, and the service voucher is associated with the client identifier.

6. The method of claim 1, wherein the managing network device is one of a plurality of service providers.

7. The method of claim 6, further comprising:
determining, at the managing network device, a message counter value from a message received from the client network device; and
determining whether to process the message based, at least in part, on a comparison of the message counter value with a previously received message counter value.

8. The method of claim 1, wherein the client network device comprises a plug-in electric vehicle, the matching service provider comprises an electric charging station, the managing network device comprises a managing system associated with a plurality of electric charging stations, and the accounting network device comprises a remote account authorization server for a client account.

9. The method of claim 1, further comprising:
determining, at the managing network device, a first value of the client identifier, the first value of the client identifier used for executing the service matching process;
determining a second value of the client identifier, the second value used for executing the account authorization process;
determining whether the first value matches the second value; and
in response to determining that the first value does not match the second value, preventing the matching service provider from servicing the client network device;
wherein said transmitting the service voucher from the managing network device to the matching service provider is in response to determining that the first value matches the second value.

10. A method comprising:
establishing, by a processor of a client network device, a secure communication channel with a managing network device of a communication network based, at least in part, on a client identifier of the client network device;
receiving, from the managing network device, identification information associated with the managing network device and an indication of a number of service matching messages to be transmitted during a service matching process, wherein the number of service matching messages is determined based, at least in part, on a service environment characteristic, wherein the service environment characteristic includes at least one member of a group consisting of a number of cables, a number of cable harnesses, and a number of switch states;
providing the client identifier and the identification information associated with the managing network device to an accounting network device to cause the accounting network device to execute an account authorization process with the client network device;
contemporaneously with the account authorization process, executing the service matching process with the managing network device and a matching service provider of the communication network, wherein the service matching process includes determining the matching service provider based, at least in part, on a service matching message of the service matching messages; and
detecting receipt of service from the matching service provider after completion of the account authorization process and the service matching process.

11. The method of claim 10, wherein the identification information associated with the managing network device comprises a device identifier of the managing network device and a location of the managing network device.

12. The method of claim 10, wherein in response to receiving, from the managing network device, a service matching parameter, the client network device initiates the service matching process.

13. The method of claim 10, further comprising:
receiving, from the managing network device, a client key that is unique to the client network device, via the secure communication channel, wherein the client key enables the client network device to securely communicate with the matching service provider;
receiving a client key generation parameter based on which the client key was determined, wherein the client key generation parameter comprises at least one member of a group consisting of a sequence number, a random number, a start/end timestamp, a lifetime duration, a message counter, and a location identifier;
signing the service matching message using the client key; and
transmitting the service matching message and the client key generation parameter to the matching service provider.

14. The method of claim 13, further comprising:
determining whether a length of the service matching message is greater than a predetermined threshold message length;
in response to determining that the length of the service matching message is greater than the predetermined threshold message length,
transmitting an initialization message including the client key generation parameter to the matching service provider, and
transmitting the client identifier and the sequence number in the service matching message; and
in response to determining that the length of the service matching message is less than the predetermined threshold message length, transmitting the client key generation parameter as part of the service matching message.

15. A managing network device comprising:
a network interface; and
a matching authorization unit executable, at least in part, from a memory by a processor coupled with the network interface, the matching authorization unit operable to:
establish a secure communication channel between a client network device and the managing network device of a communication network based, at least in part, on a client identifier of the client network device;
determine, based at least in part on a service environment characteristic, a number of service matching messages to be transmitted during a service matching process, wherein the service environment characteristic includes at least one member of a group consisting of a number of cables, a number of cable harnesses, and a number of switch states;
cause the client network device to perform an account authorization process with an accounting network device contemporaneously with the service matching process, the service matching process configured to determine a matching service provider based, at least in part, on a service matching message of the service matching messages;
match the client network device with the matching service provider;
receive a service voucher from the accounting network device authorizing the matching service provider to service the client network device in response to the accounting network device executing the account authorization process; and
transmit the service voucher to the matching service provider to allow the matching service provider to service the client network device.

16. The managing network device of claim 15, wherein the matching authorization unit is further operable to:
generate a client key that is unique to the client network device based, at least in part, on the client identifier and on a master key known to the managing network device and the matching service provider;
provide the client key to the client network device via the secure communication channel to allow the client network device to securely communicate with the matching service provider;
receive, from the matching service provider, a message that indicates a signal level detected at the matching service provider in response to the service matching message; and
select the matching service provider based, at least in part, on the matching service provider having a highest detected signal level.

17. The managing network device of claim 16, wherein the client key is a temporary key and is generated based, at least in part, on the master key, the client identifier, and at least one member of a group consisting of a sequence number, a random number, a start/end timestamp, a lifetime duration, a message counter, and a location identifier.

18. The managing network device of claim 15, wherein the matching authorization unit is further operable to:
determine a first value of the client identifier, wherein the first value of the client identifier was used for executing the service matching process;
determine a second value of the client identifier, wherein the second value was used for executing the account authorization process;
determine whether the first value matches the second value; and
in response to determining that the first value does not match the second value, the matching authorization unit is operable to prevent the matching service provider from servicing the client network device;
wherein the transmission of the service voucher to the matching service provider is in response to determining that the first value matches the second value.

19. A network device comprising:
a network interface; and
a communication unit executable, at least in part, from a memory by a processor coupled with the network interface, the communication unit operable to:
establish a secure communication channel with a managing network device of a communication network based, at least in part, on a client identifier of the network device;
receive, from the managing network device via the secure communication channel, identification information associated with the managing network device and an indication of a number of service matching messages to be transmitted during a service matching process, wherein the number is determined according to a service environment characteristic, wherein the service environment characteristic includes at least one member of a group consisting of a number of cables, a number of cable harnesses, and a number of switch states;
provide the client identifier and the identification information associated with the managing network device to an accounting network device to cause the accounting network device to execute an account authorization process with the network device;
contemporaneously with the account authorization process, execute the service matching process with the managing network device and a matching service provider of the communication network, the service matching process configured to determine the matching service provider based, at least in part, on a service matching message of the service matching messages; and
detect receipt of service from the matching service provider after completion of the account authorization process and the service matching process.

20. The network device of claim 19, wherein receipt, from the managing network device, of a service matching parameter causes the network device to initiate the service matching process.

21. The network device of claim 19, wherein the communication unit is further operable to:
receive, from the managing network device, a client key that is unique to the network device, via the secure communication channel, wherein the client key enables the network device to securely communicate with the matching service provider;
receive a client key generation parameter based on which the client key was determined, wherein the client key generation parameter comprises at least one member of a group consisting of a sequence number, a random number, a start/end timestamp, a lifetime duration, a message counter, and a location identifier;
sign the service matching message using the client key; and
transmit the service matching message and the client key generation parameter to the matching service provider.

22. The network device of claim 21, wherein the communication unit is further operable to:
determine whether a length of the service matching message is greater than a predetermined threshold message length;
in response to determining that the length of the service matching message is greater than the predetermined threshold message length,
transmit an initialization message including the client key generation parameter to the matching service provider, and transmit the client identifier and the sequence number in the service matching message; and in response to the communication unit determining that the length of the service matching message is less than the predetermined threshold message length, transmit the client key generation parameter as part of the service matching message.

23. A method comprising:

establishing, by a processor of a managing network device, a secure communication channel between a plug-in electric vehicle and the managing network device of a communication network based, at least in part, on a client identifier of the plug-in electric vehicle;

determining, based at least in part on a service environment characteristic, a number of service matching messages to be transmitted during a service matching process, wherein the service environment characteristic includes at least one member of a group consisting of a number of cables, a number of cable harnesses, and a number of switch states;

causing the plug-in electric vehicle to perform an account authorization process with an accounting network device contemporaneously with the service matching process, the service matching process configured to determine a matching electric charging station based, at least in part, on a service matching message;

matching the plug-in electric vehicle with the matching electric charging station;

receiving a service voucher at the managing network device from the accounting network device authorizing the matching electric charging station to provide electric power to the plug-in electric vehicle in response to the accounting network device executing the account authorization process; and transmitting the service voucher from the managing network device to the matching electric charging station to allow the plug-in electric vehicle to receive the electric power from the matching electric charging station.

24. The method of claim 23, further comprising:

generating, at the managing network device, a client key that is unique to the plug-in electric vehicle based, at least in part, on the client identifier and on a master key known to the managing network device and the matching electric charging station;

providing the client key from the managing network device to the plug-in electric vehicle via the secure communication channel to allow the plug-in electric vehicle to securely communicate with the matching electric charging station;

receiving, from the matching electric charging station, a message that indicates a signal level detected at the matching electric charging station in response to the service matching message; and selecting the matching electric charging station based, at least in part, on the matching electric charging station having a highest detected signal level.

25. The method of claim 24, wherein the client key is a temporary key and is generated based, at least in part, on the master key, the client identifier, and at least one member of a group consisting of a sequence number, a random number, a start/end timestamp, a lifetime duration, a message counter, and a location identifier.

26. A non-transitory machine-readable storage medium having instructions stored therein, which when executed by a processor causes the processor to perform operations that comprise:

establishing a secure communication channel between a client network device and a managing network device of a communication network based, at least in part, on a client identifier of the client network device;

determining, based at least in part on a service environment characteristic, a number of service matching messages to be transmitted during a service matching process, wherein the service environment characteristic includes at least one member of a group consisting of a number of cables, a number of cable harnesses, and a number of switch states;

causing the client network device to perform an account authorization process with an accounting network device contemporaneously with the service matching process, wherein the service matching process includes determining a matching service provider based, at least in part, on a service matching message of the service matching messages;

matching the client network device with the matching service provider;

receiving a service voucher at the managing network device from the accounting network device authorizing the matching service provider to service the client network device in response to the accounting network device executing the account authorization process; and transmitting the service voucher from the managing network device to the matching service provider to allow the matching service provider to service the client network device.

27. The non-transitory machine-readable storage medium of claim 26, wherein the operations further comprise:

generating a client key that is unique to the client network device based, at least in part, on the client identifier and a master key known to the managing network device and the matching service provider;

providing the client key to the client network device via the secure communication channel to allow the client network device to securely communicate with the matching service provider;

receiving, from the matching service provider, a message that indicates a signal level detected at the matching service provider in response to the service matching message; and selecting the matching service provider based, at least in part, on the matching service provider having a highest detected signal level.

28. The non-transitory machine-readable storage medium of claim 26, wherein the operations further comprise:

determining a first value of the client identifier, wherein the first value was used for executing the service matching process;

determining a second value of the client identifier, wherein the second value was used for executing the account authorization process;

determining whether the first value matches the second value; and in response to determining that the first value does not match the second value, preventing the matching service provider from servicing the client network device;

wherein transmitting the service voucher from the managing network device to the matching service provider is in response to determining that the first value matches the second value.

29. A non-transitory machine-readable storage medium having instructions stored therein, which when executed by a processor causes the processor to perform operations that comprise:

establishing a secure communication channel with a managing network device of a communication network based, at least in part, on a client identifier of a client network device;

receiving, from the managing network device via the secure communication channel, identification information associated with the managing network device and an indication of a number of service matching messages to be transmitted during a service matching process, wherein the number is determined based, at least in part, on a service environment characteristic, wherein the service environment characteristic includes at least one member of a group consisting of a number of cables, a number of cable harnesses, and a number of switch states;

providing the client identifier and the identification information associated with the managing network device to an accounting network device to cause the accounting network device to execute an account authorization process with the client network device;

contemporaneously with the account authorization process, executing the service matching process with the managing network device and a matching service provider of the communication network, wherein the service matching process includes determining the matching service provider based, at least in part, on a service matching message of the service matching messages; and detecting receipt of service from the matching service provider after completion of the account authorization process and the service matching process.

30. The non-transitory machine-readable storage medium of claim 29, wherein the operations further comprise:

receiving, from the managing network device, a client key that is unique to the client network device, via the secure communication channel, wherein the client key enables the client network device to securely communicate with the matching service provider;

receiving a client key generation parameter based on which the client key was determined, wherein the client key generation parameter comprises at least one member of a group consisting of a sequence number, a random number, a start/end timestamp, a lifetime duration, a message counter, and a location identifier;

signing the service matching message using the client key; and transmitting the service matching message and the client key generation parameter to the matching service provider.

31. The non-transitory machine-readable storage medium of claim 30, wherein the operations further comprise:

determining whether a length of the service matching message is greater than a predetermined threshold message length;

in response to determining that the length of the service matching message is greater than the predetermined threshold message length,
- transmitting an initialization message including the client key generation parameter to the matching service provider, and
- transmitting the client identifier and the sequence number in the service matching message; and in response to determining that the length of the service matching message is less than the predetermined threshold message length,
- transmitting the client key generation parameter as part of the service matching message.

* * * * *